(12) United States Patent
Bozchalui et al.

(10) Patent No.: US 8,718,850 B2
(45) Date of Patent: May 6, 2014

(54) SYSTEMS AND METHODS FOR USING ELECTRIC VEHICLES AS MOBILE ENERGY STORAGE

(71) Applicants: Mohammad Chehreghani Bozchalui, Cupertino, CA (US); Ratnesh Sharma, Fremont, CA (US)

(72) Inventors: Mohammad Chehreghani Bozchalui, Cupertino, CA (US); Ratnesh Sharma, Fremont, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 13/646,658

(22) Filed: Oct. 5, 2012

(65) Prior Publication Data

US 2013/0138285 A1    May 30, 2013

Related U.S. Application Data

(60) Provisional application No. 61/565,201, filed on Nov. 30, 2011.

(51) Int. Cl.
*B60L 9/00* (2006.01)
*B60L 11/00* (2006.01)
*G05D 1/00* (2006.01)
*G05F 7/00* (2006.01)
*G06F 17/00* (2006.01)

(52) U.S. Cl.
USPC .......................................................... 701/22

(58) Field of Classification Search
USPC .................... 701/22; 700/291, 292, 286, 297;
361/500, 502, 503, 504; 307/24, 26,
307/64, 66, 82, 104
See application file for complete search history.

(56) References Cited

U.S. PATENT DOCUMENTS

| | | | |
|---|---|---|---|
| 7,612,466 B2 * | 11/2009 | Skutt ............................... 307/29 |
| 7,687,937 B2 * | 3/2010 | Lasseter et al. ................. 307/69 |
| 2009/0210357 A1 * | 8/2009 | Pudar et al. .................... 705/412 |
| 2009/0259346 A1 * | 10/2009 | Reed et al. ..................... 700/295 |
| 2010/0082464 A1 * | 4/2010 | Keefe .............................. 705/32 |
| 2010/0174500 A1 * | 7/2010 | Plett ............................... 702/63 |
| 2010/0235025 A1 * | 9/2010 | Richter et al. ................... 701/22 |
| 2010/0274656 A1 * | 10/2010 | Genschel et al. .......... 705/14.27 |
| 2011/0025556 A1 * | 2/2011 | Bridges et al. ........... 342/357.25 |
| 2011/0047052 A1 * | 2/2011 | Cornish ......................... 705/30 |
| 2011/0202192 A1 * | 8/2011 | Kempton ...................... 700/291 |
| 2011/0202217 A1 * | 8/2011 | Kempton ........................ 701/22 |
| 2011/0202418 A1 * | 8/2011 | Kempton et al. ............ 705/26.1 |
| 2012/0112696 A1 * | 5/2012 | Ikeda et al. .................... 320/109 |

OTHER PUBLICATIONS

Mohamed et la., "MicroGrid Online Management and Balancing Using Multiobjective Optimization", 2007.*
Hu et al. "Optimal Operation of Electric Vehicles in Competitive Electricity Markets and Its Impact on Distribution Power System", 2011.*
Mohamed et al., "System Modelling and Online Optimal Management of MicroGrid with Battery Storage", 2007.*
Sortomme, "Combined Bidding of Regulation and Spinning Reserves for Unidirectional Vehicle-to-Grid", 2011.*
Tomic et al., Using fleets of electric-drive vehicles for grid support, 2007.*
Huston, Intelligent Scheduling of Hybrid and Electric Vehicle Storage Capacity in a Parking Lot for Profit Maximization in Grid Power Transactions, IEEE Energy2030, Atlanta, GA USA Nov. 17-18, 2008.
Hu, Optimal Operation of Electric Vehicles in Competitive Electricity Markets and Its Impact on Distribution Power Systems, 2011 IEEE Trondheim PowerTech.
Momber, Plug-in Electric Vehicle Interactions with a Small Office Building: An Economic Analysis using DER-CAM, IEEEE 2010.

* cited by examiner

*Primary Examiner* — Khoi Tran
*Assistant Examiner* — Rachid Bendidi
(74) *Attorney, Agent, or Firm* — Joseph Kolodka (57) ABSTRACT

Systems and methods are disclosed for energy management by receiving parameters from commercial building energy system components; optimizing models of system components; optimizing for selected objective functions; generating an optimal operation schedule for the system components; analyzing economic and environmental impacts and optimizing operations of electric vehicles (EVs) for mobile energy storage in commercial buildings.

18 Claims, 4 Drawing Sheets

SYSTEMS AND METHODS FOR USING ELECTRIC VEHICLES AS MOBILE ENERGY STORAGE

This application claims priority to Provisional Application Ser. No. 61/565,201 filed Nov. 30, 2011, the content of which is incorporated by reference.

BACKGROUND

This application relates to mobile energy storage systems in commercial buildings.

Electric vehicles (EVs) have attracted much attention in recent years mainly due to economic and environmental concerns. It is expected that 3 million EVs to be on the road in California by 2015. While wide-scale penetration of EVs in electric systems brings new challenges to electric systems that need to be addressed, at the same time, it shows great potentials and new opportunities to improve efficiency of energy and transportation sectors. One can take advantage of the unique characteristics of these relatively new components of energy systems to address some of the existing issues of the grid.

Figure 1:
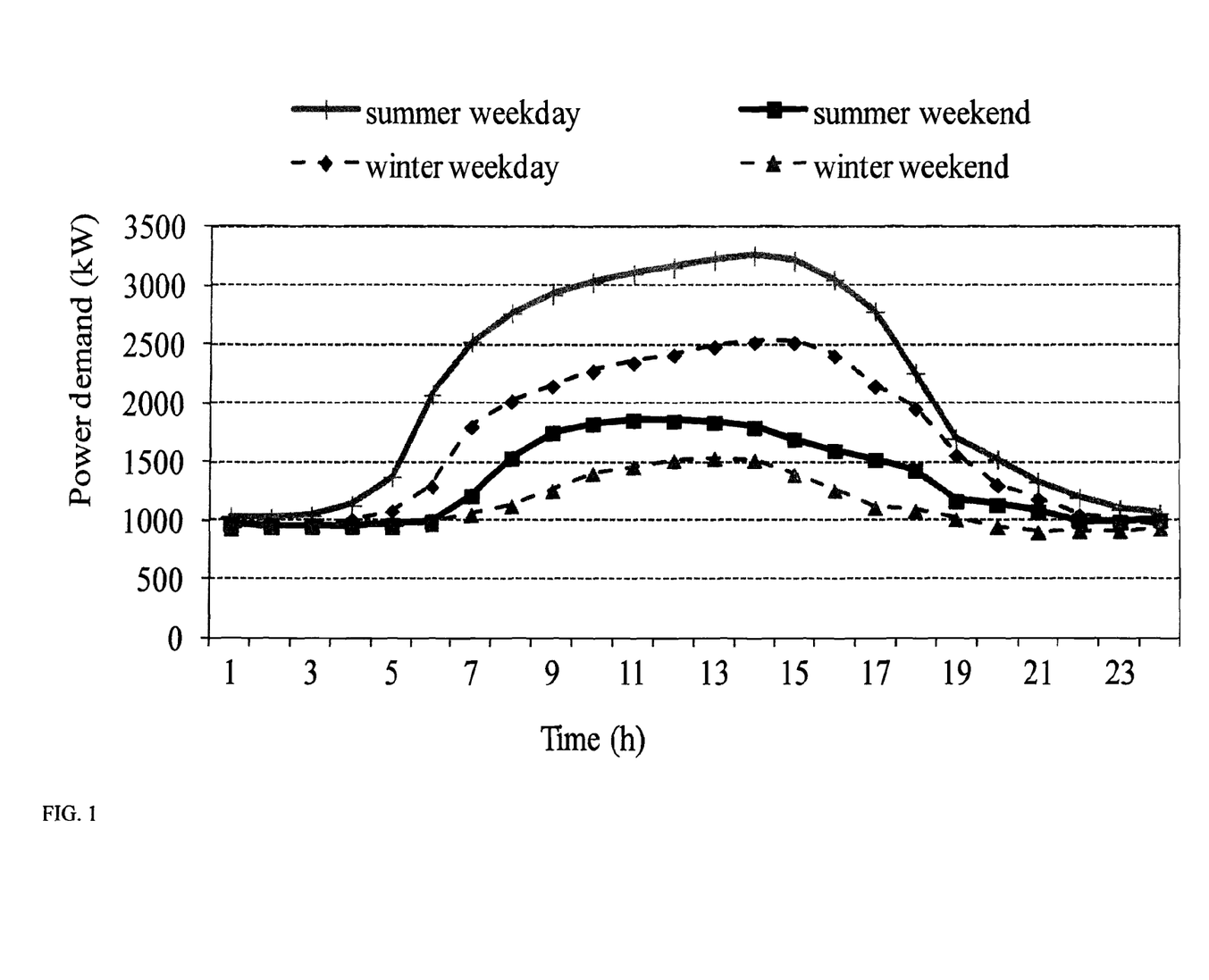
FIG. 1 shows an exemplary load profile of a large commercial building office during weekdays and weekends for summer and winter.

In the context of smart grids, smart distribution systems are envisioned as coupled microgrids ($\mu$G) that not only are connected to the grid, but also utilize Distributed Energy Resources (DERs) to generate power. High level of DERs integration in $\mu$Gs raises concerns about the availability of high quality power supply mainly due to the variable and intermittent nature of power generation by Renewable Energy Resources (RESs). To cope with these issues, energy storage systems have been proposed to be used in $\mu$Gs with DERs. When added, an energy storage system can immediately improve $\mu$Gs' availability. Today, pumped hydro, flywheel, compressed air, and different types of batteries are the main energy storage technologies considered in the US electric power grid. In addition to these technologies, EVs can be considered as Mobile Energy Storage (MES) that are available only during certain hours of the day. FIG. 1 shows an exemplary load profile of a large commercial building office during weekdays and weekends for summer and winter. As shown therein, peak energy usage occurs during working hours, and drops off during non-working hours.

SUMMARY

In one aspect, systems and methods are disclosed for energy management by receiving parameters from commercial building energy system components; optimizing models of system components; optimizing for selected objective functions; generating an optimal operation schedule for the system components; analyzing economic and environmental impacts and optimizing operations of electric vehicles (EVs) for mobile energy storage in commercial buildings.

In another aspect, systems and methods are disclosed that uses Electric Vehicles (EVs) as Mobile Energy Storage (MES) that are available only during certain hours of the day. For commercial buildings, employees can plug in their EVs to the building energy system to be charged and/or discharged by Energy Management System (EMS) of the building. One embodiment analyzes economic and environmental benefits of the application of EVs as MES in commercial building $\mu$Gs. The system models energy systems of a commercial building including its grid connection, DERs, Stationary Energy Storage (SES), and demand profile. Based on the developed models, a Mixed Integer Linear Programming (MILP) problem is formulated in one embodiment to optimizes the operation of a commercial building $\mu$G. The objective is to minimize $\mu$G's daily operational costs and greenhouse gas emissions (GHG). Technical and operational constraints of DERs and Energy Storage (ES) systems such as minimum up time and down time, and charging and discharging power and capacity constraints of ES devices are formulated to appropriately model the operation of a grid connected commercial $\mu$G.

Advantages of the preferred embodiments may include one or more of the following. The system provides economic and environmental benefits of the application of EVs as MES in commercial building $\mu$Gs. A comprehensive analysis is done where energy systems of a commercial building including its grid connection, DERs, Stationary Energy Storage (SES), and demand profile are modeled. Based on the developed models, a Mixed Integer Linear Programming (MILP) problem is formulated to optimizes the operation of a commercial building $\mu$G. The system minimizes $\mu$G's daily operational costs and greenhouse gas emissions (GHG). Technical and operational constraints of DERs and Energy Storage (ES) systems such as minimum up time and down time, and charging and discharging power and capacity constraints of ES devices are formulated to appropriately model the operation of a grid connected commercial $\mu$G. The ability to use EVs to augment energy supply is particularly of interest for commercial buildings, where employees can plug in their EVs to the building energy system to be charged and/or discharged by Energy Management System (EMS) of the building. Technical and operational constraints of DERs and ES such as minimum up time and down time, load sharing characteristics of diesel generators, and charging and discharging constraints of ES devices are formulated to appropriately model the operation of a grid connected commercial $\mu$G. This provides a more accurate model to assess economic and environmental impacts of EVs in commercial buildings.

DESCRIPTION

In Smart Grids, commercial buildings can be seen as $\mu$Gs that not only have grid connection, but also utilize various types of DERs to supply their demand. In this context, commercial building EMSs are expected to have the capability of controlling the operation of various components of their energy systems including DERs, ESs, and energy trade with the grid.

In commercial building $\mu$Gs, EVs can be considered as MES mediums that are only available during certain hours of the day, and during these hours, the EMS can utilize both the energy stored in these EVs and their connected capacity. In this work, we consider integrated values of all connected EVs to the commercial building as a single MES. This MES is assumed to have a known (forecasted) connection time, available capacity and stored energy. The available capacity and stored energy of the MES might change during the day, reflecting the connection/disconnection of EVs to/from the building. The developed model generates operational schedule for all the components, including MES. The charging/discharging control of the obtained schedule for the MES among the connected EVs can be estimated using suitable processes.

Figure 2:
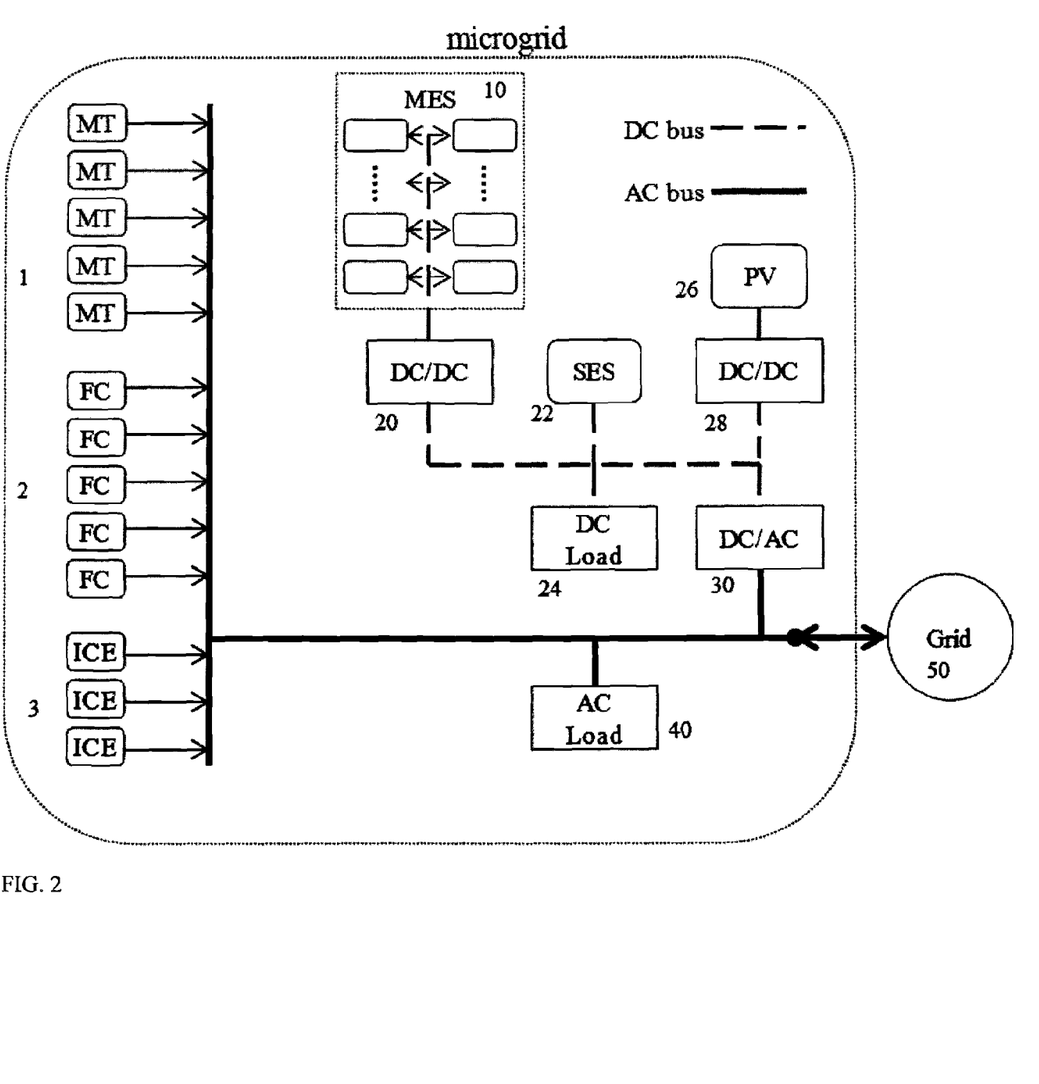
FIG. 2 shows an exemplary block diagram of a commercial building microgrid.

A block diagram of an exemplary commercial building μG used to carry out simulations is presented in FIG. 2. The μG consists of DC and AC buses and utilizes PV, FC, ICE, and MT in addition to the grid connection to supply its demand. SES and MES are connected to the DC bus of the system and their energy flow and storage can be controlled by the EMS of the μG. The μG trades energy with the grid and can sell to and/or buy from the grid. The grid charges the μG for its energy consumption and peak demand, and pays for its energy supply and spinning reserve capacity. As shown therein, MTs 1, FC 2, and ICE 3 supply energy over AC/DC buses to power AC load 40, DC/AC converter 30, and grid 50. Each vehicle or MES 10 includes a plurality of battery units that are connected to a DC/DC converter 20 that provides energy over a private bus to supply power to a DC load 24, SES 22, and DC/AC converter 30. A photovoltaic panel 26 can power a DC/DC converter 28 that supplies power to the private bus.

Figure 3:
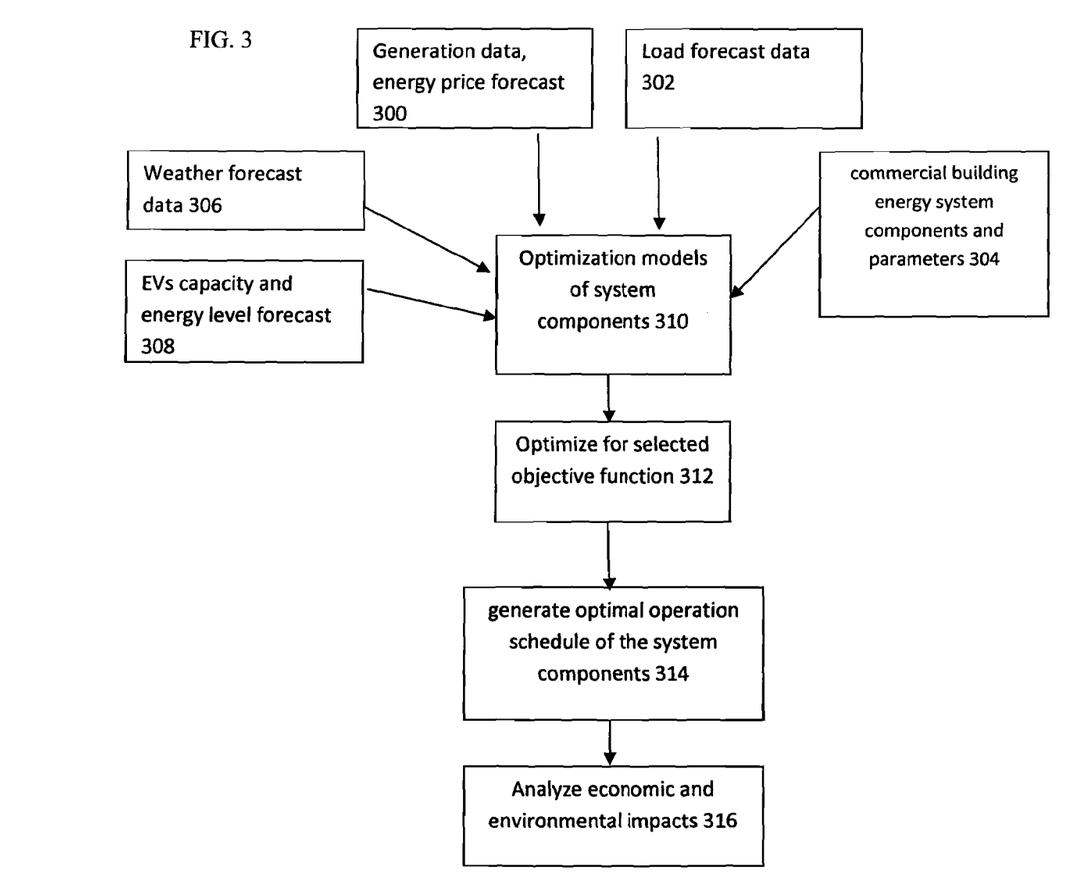
FIG. 3 shows an exemplary system for optimizing economic and environmental impacts using EVs as mobile energy storage systems.

FIG. 3 shows an exemplary system for optimizing economic and environmental impacts using EVs as mobile energy storage systems. Power generation data and energy price forecast are provided (300). Load forecast data is also input (302). The system also receives commercial building energy system components and parameters (304). Weather forecast data (306) is provided. EV capacity and energy level forecast are also received (308). With the input data, the system performs one or more optimization models of the system components (310). Next, the system optimizes for selected objective functions (312). An optimal generation schedule of system components is generated (314). The system then analyzes economic and environmental impacts (316).

Figure 4:
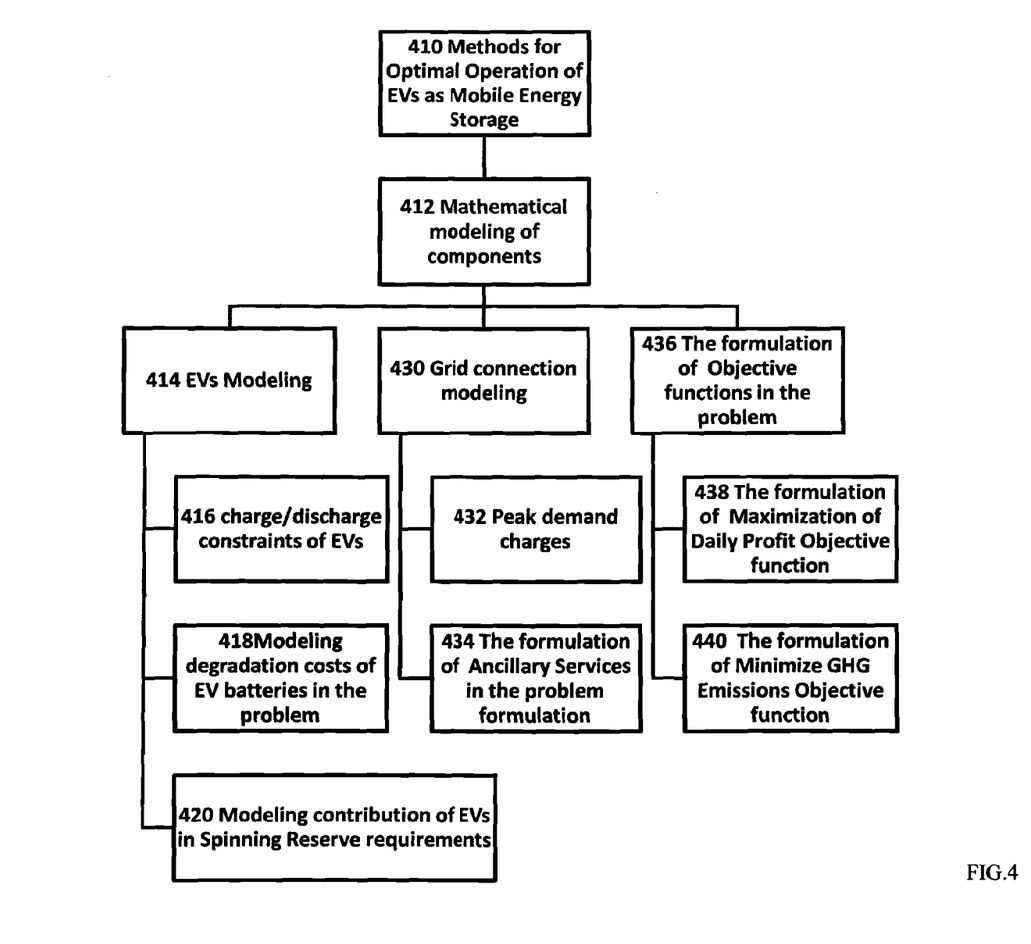
FIG. 4 shows an exemplary system for Using EVs as mobile energy storage in commercial buildings.

FIG. 4 shows an exemplary system for Using EVs as mobile energy storage in commercial buildings as Methods for Optimal Operation of EVs as Mobile Energy Storage 410. In 412, the system performs mathematical modeling of components. In 414, modeling of EVs is done. This include modeling of charge/discharge constraints of EVs in 416. In 418, the system performs modeling degradation costs of EV batteries. In 420, the system performs modeling contribution of EVs in Spinning Reserve requirements.

Next, in 430, the system performs grid connection modeling. In 432, peak demand charges are determined. In 434, the system performs formulation of Ancillary Services.

In 436, the system formulates objective functions in the problem. In 438, the formulation of a Maximization of Daily Profit Objective function is determined. In 440, the system minimizes a GHG Emissions Objective function.

In one implementation, the energy balance equation for MES is given as follows:

$$e_{mes,t} = (1-\Phi_{mes})e_{mes,t-1} + \tau\left(p_{mes,t}^{chg}\eta_{mes}^{chg} - \frac{p_{mes,t}^{dch}}{\eta_{mes}^{dch}}\right) + E_{mes,t}^{conn} - E_{mes,t}^{disc} \quad (1)$$

where $E_{mes,t}^{conn}$ and $E_{mes,t}^{disc}$ represent energy level of EVs connected to and disconnected from the building at time t, respectively. These parameters are assumed to be exogenous inputs to this model. Energy storage level of MES is limited by minimum and maximum available capacities of the MES at each time interval, $\underline{E}_{mes,t}$ and $\overline{E}_{mes,t}$ respectively, as follows:

$$\underline{SOC}_{mes}\overline{E}_{mes,t} \le e_{mes,t} \le \overline{SOC}_{mes}\overline{E}_{mes,t} \quad (2)$$

where $\overline{E}_{mes,t}$ not only takes into account the physically available connected capacity of EVs to the building, but also considers EV owners' preferences on available energy at the disconnection time of the EV. If EV owners do not provide any specific disconnection time energy level of their vehicles, then $\overline{E}_{mes,t}$ of the MES is built based on the rated capacity connected and disconnected EVs' batteries using the following equation:

$$\overline{E}_{mes,t} = (\overline{E}_{mes,t-1} + \overline{E}_{mes,t}^{conn} - \overline{E}_{mes,t}^{disc}) \quad (13)$$

$$\underline{E}_{mes,t} = (\underline{E}_{mes,t-1} + \underline{E}_{mes,t}^{conn} - \underline{E}_{mes,t}^{disc}) \quad (4)$$

where $\overline{E}_{mes,t}^{conn}$ and $\overline{E}_{mes,t}^{disc}$ represent connected and disconnected EV capacities at time t.

The system also considers charge/discharge constraints of EVs. The following constraints are considered to ensure that $p_{mes,t}^{chg}$ and $p_{mes,t}^{dch}$ are less than maximum charging and discharging power of the MES at each time interval:

$$0 \le p_{mes,t}^{chg} \le u_{mes,t}^{chg}\overline{P}_{mes,t} \quad (5)$$

$$0 \le p_{mes,t}^{dch} \le u_{mes,t}^{dch}\overline{P}_{mes,t} \quad (6)$$

where $\overline{P}_{mes,t}$ and $\underline{P}_{mes,t}$ are calculated as follows:

$$\overline{P}_{mes,t} = (\overline{P}_{mes,t-1} + \overline{P}_{mes,t}^{conn} - \overline{P}_{mes,t}^{disc}) \quad (7)$$

Operational and maintenance costs of MES includes its degradation costs and considers the effect of charging and discharging cycles on capacity loss of the MES, is assumed to be proportional to the number of charging and discharging cycles, and is modeled as follows:

$$v_{ses,t}^{chg} \ge u_{ses,t}^{chg} - u_{ses,t-1}^{chg} \quad (8)$$

$$v_{ses,t}^{dch} \ge u_{ses,t}^{dch} - u_{ses,t-1}^{dch} \quad (9)$$

$$C_{mes,t} = \quad (10)$$

$$C_{mes}^{dg}\frac{1}{2}\left(v_{mes,t}^{chg} + v_{mes,t}^{dch}\right) + C_{mes}^{c}\overline{E}_{mes,t} + \frac{p_{mes,t}^{dch}}{\eta_{mes}^{dch}}C_{mes,t}^{s} - \frac{p_{mes,t}^{chg}}{\eta_{mes}^{chg}}C_{mes,t}^{d}$$

where $C_{mes}^{dg}$ represents costs of the MES degradation per cycle to be paid by the μG operator to EV owners to reimburse their battery degradation due to charge and discharge by the EMS, $C_{mes}^{c}$ denotes capacity costs to be paid by the μG operator to EV owners for the hours connecting their vehicles to the building EMS. $C_{mes,t}^{s}$ and $C_{mes,t}^{d}$ represent the selling and buying energy price of the EV, respectively.

In another embodiment, the system models degradation costs of EV batteries $$C_{mes,t} = \quad (11)$$

$$C_{mes}^{dg}\frac{1}{2}\left(v_{mes,t}^{chg} + v_{mes,t}^{dch}\right) + C_{mes}^{c}\overline{E}_{mes,t} + \frac{p_{mes,t}^{dch}}{\eta_{mes}^{dch}}C_{mes,t}^{s} - \frac{p_{mes,t}^{chg}}{\eta_{mes}^{chg}}C_{mes,t}^{d}$$

where $C_{mes}^{dg}$ represents costs of the MES degradation per cycle to be paid by the μG operator to EV owners to reimburse their battery degradation due to charge and discharge by the EMS, $C_{mes}^c$ denotes capacity costs to be paid by the μG operator to EV owners for the hours connecting their vehicles to the building EMS.

Modeling contribution of EVs in Spinning Reserve requirements can be done. If $p_{ses,t}^{sp}$ and $p_{mes,t}^{sp}$ represent the spinning reserve provided by the SES and MES at time t, respectively, and calculated as follows:

$$p_{ses,t}^{sp} = \min\left\{\frac{(e_{ses,t} - SOC_{ses}\overline{E}_{ses})}{\tau}, \overline{P}_{ses} - p_{ses,t}^{dch}\right\} \quad (37)$$

$$p_{mes,t}^{sp} = \min\left\{\frac{(e_{mes,t} - SOC_{mes}\overline{E}_{mes,t})}{\tau}, \overline{P}_{mes,t} - p_{mes,t}^{dch}\right\} \quad (38)$$

These constraints are reformulated as linear constraints in the mode as follows:

$$p_{ses,t}^{sp} \leq \frac{(e_{ses,t} - SOC_{ses}\overline{E}_{ses})}{\tau} \quad (39)$$

$$p_{ses,t}^{sp} \leq \overline{P}_{ses} - p_{ses,t}^{dch} \quad (40)$$

$$p_{mes,t}^{sp} \leq \frac{(e_{mes,t} - SOC_{mes}\overline{E}_{mes,t})}{\tau} \quad (41)$$

$$p_{mes,t}^{sp} \leq \overline{P}_{mes,t} - p_{mes,t}^{dch} \quad (42)$$

The system also performs modeling of the grid connection in the problem formulation. It is assumed that the connection between the μG and the grid has a maximum power transfer capability limit, which implies that purchasing and selling power from/to the grid should be within this limit, as follows:

$$-\underline{P}_g \leq p_{g,t} \leq \overline{P}_g \quad (35)$$

The formulation of Ancillary Services in the problem formulation can be done. In the grid-connected mode, the μG can participate in ancillary service markets of the grid such as spinning reserve market. This market participation is formulated as follows:

$$p_{sp,t} = \sum_{i=1}^{N_i}(\overline{P}_i u_{i,t} - p_{i,t}) + \sum_{m=1}^{N_m}(\overline{P}_m u_{m,t} - p_{m,t}) + \sum_{f=1}^{N_f}(\overline{P}_f u_{f,t} - p_{f,t}) + p_{mes,t}^{sp} + p_{ses,t}^{sp} - 0.1 P_{D,t} \quad (36)$$

where $p_{sp,t}$ is the amount of spinning reserve power that the μG can offer in the ancillary service market. Note that the spinning reserve is based on the controllable DERs and solar PV is not considered as a source of spinning reserve. Also, the μG should always have a 10% spinning reserve for itself in addition to its bid in the market.

The System can Perform Formulation of Maximization of Daily Profit Objective Function.

Daily profit of the μG, which is defined as the difference of its revenue and costs, is as follows:

$$\min p^{dc} C_g^{dc} + \quad (43)$$

$$\sum_{t=1}^{T} \tau \left[ -p_{sp,t} C_{g,t}^{sp} + p_{g,t} C_{g,t}^s + \sum_{i=1}^{N_i} c_{i,t} + \sum_{m=1}^{N_m} c_{m,t} + \sum_{f=1}^{N_f} c_{f,t} + C_{pv}^{om} + c_{ses,t} + c_{mes,t} \right]$$

where $C_{g,t}^{sp}$, $C_{g,t}^s$, and $C_g^{dc}$ denote spinning reserve price, energy charges, and demand charges of the grid, respectively.

The System can Formulate and Minimize GHG Emissions Objective Function in the Problem Formulation.

Minimization of GHG emissions of the μG in the grid-connected mode is formulated as follows:

$$\min \sum_{t=1}^{T} \tau \left[ \sum_{i=1}^{N_i} \varepsilon_i^{GHG} \frac{p_{i,t}}{\eta_i} + \varepsilon_m^{GHG} \frac{p_{m,t}}{\eta_m} + \varepsilon_f^{GHG} \frac{p_{f,t}}{\eta_f} + \varepsilon_{g,t}^{GHG} p_{g,t} \right] + \quad (44)$$

$$(e_{mes,T} - e_{mes,0}) \varepsilon_{mes}^{GHG}$$

where $\epsilon_{g,t}^{GHG}$ denotes marginal GHG emission of the grid at time t.

A. Simulations Cases

Table I presents a summary of the simulation cases carried out to study the economic and environmental impacts of EVs' integration into commercial building μGs. These cases are run for both maximization of daily profit and minimization of GHG emissions objective functions.

TABLE I

PARAMETERS OF THE μG'S ES COMPONENTS

| Case | Summary | Description |
|---|---|---|
| 0 | No EV, No DER, No spinning reserve (only grid connection) | The power demand of the μG is supplied by the grid connection and all the DERs are assumed to be turned off. This case is considered to provide a base case for the comparison purposes only. |
| 1 | With DERs and grid connection, without EVs and spinning reserve | The μG is operated optimally while there is no EVs and spinning reserve market, and the μG is only paid for its energy trade with the grid. |
| 2 | With DERs and spinning reserve market, without EVs | The μG is optimally operated while there is no EVs connected to the building and the μG can participate in the spinning reserve and energy market. |
| 3 | With DERs and EVs, and without spinning reserve market | The μG is optimally operated while considering the EVs connected to the building and the μG cannot participate in spinning reserve market. |
| 4 | With EVs, DERs, and spinning reserve market | The μG is optimally operated while considering the EVs and spinning reserve market participation in its operation. |

1) Case 0: The Base Case

In this case, the power demand of the μG is supplied by the grid connection and all the DERs are assumed to be turned off. This case is considered to provide a base case for the comparison purposes only.

2) Case 1: No EVs and No Spinning Reserve Market Participation

In this case, it is assumed that the μG is operated optimally while there is no EVs and spinning reserve market, and the μG is only paid for its energy trade with the grid.

3) Case 2: No EVs with Spinning Reserve Market Participation

The μG is optimally operated while there is no EVs connected to the building and the μG can participate in the spinning reserve and energy market.

4) Case 3: with EVs and without Spinning Reserve Market Participation

The μG is optimally operated while considering the EVs connected to the building and the μG cannot participate in spinning reserve market.

5) Case 4: with EVs and Spinning Reserve Market Participation

In this case, the μG is optimally operated while considering the EVs and spinning reserve market participation in its operation.

Mathematical models representing a commercial building μG components are described in details as follows:

B. Stationary Energy Storage

Energy balance equation for SES is given as follows:

$$e_{ses,t} = (1-\varphi_{ses})e_{ses,t-1} + \tau\left(p_{ses,t}^{chg}\eta_{ses}^{chg} - \frac{p_{ses,t}^{dch}}{\eta_{ses}^{dch}}\right) \quad (1)$$

where $e_{ses,t}$, $\phi_{ses}$, and τ represent energy storage level at time t, energy loss, and the time interval in hours, respectively. $p_{ses,t}^{chg}$, $\eta_{ses}^{chg}$, $p_{ses,t}^{dch}$, and $\eta_{ses}^{dch}$ stand for charging and discharging power and efficiencies of the SES, respectively.

Stored energy within the SES is limited by its minimum and maximum State Of Charge, $\underline{SOC}$ and $\overline{SOC}$ respectively, as follows:

$$\underline{SOC}_{ses}\overline{E}_{ses} \leq e_{ses,t} \leq \overline{SOC}_{ses}\overline{E}_{ses} \quad (2)$$

It is assumed that energy storage level of the SES at the end of the scheduling horizon, T, to be equal to its initial value, as follows:

$$e_{ses,0} = e_{ses,T} = E_{ses,initial} \quad (3)$$

The following constraints are considered to ensure that $p_{mes,t}^{chg}$ and $p_{mes,t}^{dch}$ are less than maximum charging and discharging power ratings of the SES:

$$0 \leq p_{ses,t}^{chg} \leq u_{ses,t}^{chg}\overline{P}_{ses} \quad (4)$$

$$0 \leq p_{ses,t}^{dch} \leq u_{ses,t}^{dch}\overline{P}_{ses} \quad (5)$$

where, $u_{ses,t}^{chg}$ and $u_{ses,t}^{dch}$ are binary variables representing charging and discharging operation modes of the SES. Notice that (4) enforces the charging power to be zero if the SES is not in the charging mode (i.e., $u_{ses,t}^{chg}=0$); similarly, (5) for the discharge mode.

The SES can either operate in the charging or discharging modes at a time, which is formulated using the following constraint:

$$u_{ses,t}^{chg} + u_{ses,t}^{dch} \leq 1 \quad (6)$$

To incorporate the operational costs of SES, and the cost of battery degradation due to charging and discharging in the objective function, start up flags are defined as follows:

$$v_{ses,t}^{chg} \geq u_{ses,t}^{chg} - u_{ses,t-1}^{chg} \quad (7)$$

$$v_{ses,t}^{dch} \geq u_{ses,t}^{dch} - u_{ses,t-1}^{dch} \quad (8)$$

where $v_{mes,t}^{chg}$ and $v_{mes,t}^{dch}$ represent start up flags for the charging and discharging modes, respectively.

Operational and maintenance costs of SES, which includes its degradation costs, is assumed to be proportional to the number of charging and discharging cycles, as follows:

$$C_{ses,t} = C_{ses}^{dg}\frac{1}{2}(v_{ses,t}^{chg} + v_{ses,t}^{dch}) + C_{ses}^{m}\overline{E}_{ses,t} \quad (9)$$

where $C_{ses}^{m}$ and $\overline{E}_{ses,t}$ denote maintenance cost and maximum capacity of the SES, respectively, and $C_{ses}^{dg}$ represents degradation costs of the SES per cycle, calculated based on total number of charging and discharging cycles of the SES from manufacturer data and its replacement costs.

C. Mobile Energy Storage

Energy balance equation for MES is given as follows:

$$e_{mes,t} = (1-\varphi_{mes})e_{mes,t-1} + \tau\left(p_{mes,t}^{chg}\eta_{mes}^{chg} - \frac{p_{mes,t}^{dch}}{\eta_{mes}^{dch}}\right) + I_{mes,t} - O_{mes,t} \quad (10)$$

where $I_{mes,t}$ and $O_{mes,t}$ represent energy level of EVs connected to and disconnected from the building at time t, respectively. These parameters are assumed to be exogenous inputs to this model.

Energy storage level of MES is limited by minimum and maximum available capacities of the MES at each time interval, $\underline{E}_{mes,t}$ and $\overline{E}_{mes,t}$ respectively, as follows:

$$\underline{SOC}_{mes}\overline{E}_{mes,t} \leq e_{mes,t} \leq \overline{SOC}_{mes}\overline{E}_{mes,t} \quad (11)$$

where $\overline{E}_{mes,t}$ not only takes into account the physically available connected capacity of EVs to the building, but also considers EV owners' preferences on available energy at the disconnection time of the EV. If EV owners do not provide any specific disconnection time energy level of their vehicles, then $\overline{E}_{mes,t}$ of the MES is built based on the rated capacity connected and disconnected EVs' batteries using the following equation:

$$\overline{E}_{mes,t} = (\overline{E}_{mes,t-1} + \overline{E}_{mes,t}^{conn} - \overline{E}_{mes,t}^{disc}) \quad (12)$$

$$\underline{E}_{mes,t} = (\underline{E}_{mes,t-1} + \underline{E}_{mes,t}^{conn} - \underline{E}_{mes,t}^{disc}) \quad (13)$$

where $\overline{E}_{mes,t}^{conn}$ and $\overline{E}_{mes,t}^{disc}$ represent connected and disconnected EV capacities at time t.

The following constraints are considered to ensure that $p_{mes,t}^{chg}$ and $p_{mes,t}^{dch}$ are less than maximum charging and discharging power of the MES at each time interval:

$$0 \leq p_{mes,t}^{chg} \leq u_{mes,t}^{chg}\overline{P}_{mes,t} \quad (14)$$

$$0 \leq p_{mes,t}^{dch} \leq u_{mes,t}^{dch}\overline{P}_{mes,t} \quad (15)$$

where $\overline{P}_{mes,t}$ and $\underline{P}_{mes,t}$ are calculated as follows:

$$\overline{P}_{mes,t} = (\overline{P}_{mes,t-1} + \overline{P}_{mes,t}^{conn} - \overline{P}_{mes,t}^{disc}) \quad (16)$$

Operational and maintenance costs of MES includes its degradation costs and considers the effect of charging and discharging cycles on capacity loss of the MES, is assumed to be proportional to the number of charging and discharging cycles, and is modeled as as follows:

$$v_{ses,t}^{chg} \geq u_{ses,t}^{chg} - u_{ses,t-1}^{chg} \quad (17)$$

$$v_{ses,t}^{dch} \geq u_{ses,t}^{dch} - u_{ses,t-1}^{dch} \quad (18)$$

$$C_{mes,t} = \quad (19)$$

$$C_{mes}^{dg}\frac{1}{2}(v_{mes,t}^{chg} + v_{mes,t}^{dch}) + C_{mes}^{c}\overline{E}_{mes,t} + \frac{p_{mes,t}^{dch}}{\eta_{mes}^{dch}}C_{mes,t}^{s} - \frac{p_{mes,t}^{chg}}{\eta_{mes}^{chg}}C_{mes,t}^{d}$$

where $C_{mes}^{dg}$ represents costs of the MES degradation per cycle to be paid by the μG operator to EV owners to reimburse their battery degradation due to charge and discharge by the EMS, $C_{mes}^{c}$ denotes capacity costs to be paid by the μG operator to EV owners for the hours connecting their vehicles to the building EMS. $C_{mes,t}^{s}$ and $C_{mes,t}^{d}$ represent the selling and buying energy price of the EV, respectively.

D. Solar Photo-Voltaic (PV) Generation

Recently, solar PV panels are being widely installed in various types of building, and are expected to be one the major renewable energy resources in μGs. Solar PV generation of a building at each time interval is calculated using the following:

$$P_{pv,t} = S_{pv} \eta_{pv} R_t, \tag{20}$$

where $S_{pv}$, $\eta_{pv}$, and $R_t$ denote solar panels area, PV efficiency, and solar irradiation, respectively. Operational costs of PV is assumed to be a fixed maintenance cost per time interval, $C_{pv}^m$.

E. Internal Combustion Engines

Internal Combustion Engines (ICEs) include spark- or compressed-ignition engines powered by either natural gas, petroleum, gasoline, or diesel fuels. ICEs' technology maturity, relatively high efficiencies and low costs, and rapid start-up and shutdown make them competitive for many DER applications, particularly for commercial buildings [14]. The mathematical model formulated for ICEs is presented next.

Minimum and maximum power output characteristics of ICE units are modeled as follows:

$$\underline{P_g} u_{g,t} \leq p_{g,t} \leq \overline{P_g} u_{g,t}, \tag{21}$$

where $\overline{P_g}$ and $\underline{P_g}$ denote upper and lower bounds of ICE's power generation, respectively, and $u_{g,t}$ represents a binary variable indicating On/Off state of ICE $g$ in time $t$.

Minimum up-time and down-time characteristics of ICEs are formulated using the following constraints:

$$v_{g,t} - w_{g,t} = u_{g,t} - u_{g,t-1}, \forall t \in [2T] \tag{22}$$

$$v_{g,t} + w_{g,t} \leq 1, \forall t \in [2,T] \tag{23}$$

$$\Sigma_{s=t-UP_g+1}^{t} v_{g,s} \leq u_{g,t}, \forall t \in [UP_g+1, T] \tag{24}$$

$$\Sigma_{s=t-DN_g+1}^{t} w_{g,s} \leq 1 - u_{g,t}, \forall t \in [DN_g+1, T] \tag{25}$$

where $v_{g,t}$ and $w_{g,t}$ are binary variables indicating start-up and shutdown states of ICEs, respectively, $UP_g$ is the minimum up time of device $g$ in hours, and $DN_g$ is the minimum down time of device $g$ in hours.

Ramp up and ramp down characteristics of ICEs, which limit their power output change between two consecutive time intervals, are also modeled. Since these limits might be different for the start-up conditions, the following constraints are formulated to properly capture these physical characteristics of ICEs:

$$p_{g,t} - p_{g,t-1} \leq \overline{R}_g u_{g,t-1} + R_g^{SU}(1 - u_{g,t-1}), \forall t \in [2,T] \tag{26}$$

$$p_{g,t-1} - p_{g,t} \leq \underline{R}_g u_{g,t} + R_g^{SD}(1 - u_{g,t}), \forall t \in [2,T] \tag{27}$$

where $\overline{R}_g$ and $\underline{R}_g$ denote ramp up and ramp down limits of ICEs, respectively, and $R_g^{SU}$ and $R_g^{SD}$ denote these limits during start up and shutdown times.

If there is more than one ICE within a μG, the demand usually is shared between the operating generators in proportion of their rated power. This operational constraint is formulated using the following constraints:

$$\frac{p_{g,t}}{\overline{P}_g} \leq r + (1 - u_{g,t})M, \quad \forall g, t \tag{28}$$

$$\frac{p_{g,t}}{\overline{P}_g} \geq r + (u_{g,t} - 1)M, \quad \forall g, t \tag{29}$$

where $r$ represents the per unit ration of load sharing among the operating units, and $M$ denotes a large positive number.

Operational costs of ICEs are approximated as a linear expression including fixed costs, fuel consumption costs considering a constant efficiency coefficient, and start up and shut down costs, as follows:

$$C_{g,t} = A_g + B_g \frac{p_{g,t}}{\eta_g} + v_{g,t} C_g^{SU} + w_{g,t} C_g^{SD} + C_g^m \overline{P}_g \tag{30}$$

where $A_g$ and $B_g$ denote the fuel cost coefficients, $C_g^{SU}$ and $C_g^{SD}$ represent start up and shut down costs, and $\eta_g$ and $C_g^m$ indicate efficiency and maintenance costs of ICE units, respectively.

F. Micro Turbines

Micro Turbines (MTs) are high speed combustion turbines that are suited for smaller-capacity applications, and can use variety of fuels including natural gas, gasoline, diesel, and bio-gases. MTs' compact sizes, low capital and maintenance costs, and low emissions make them attractive for commercial μG applications. By using a MT appropriately sized for power-only applications, the mathematical formulations developed for ICEs, (15) to (21), with different parameter settings can be used to model the operation of MTs. Operational costs of MTs is formulated as follows:

$$C_{MT,t} = A_{MT} + B_{MT} \frac{p_{MT,t}}{\eta_{MT}} + v_{MT,t} C_{MT}^{SU} + C_{MT}^m \overline{P}_{MT}, \tag{31}$$

G. Fuel Cells

Fuel Cells (FCs) are electrochemical devices that generate power supply by converting hydrogen energy to Direct Current (DC) electricity. Phosphoric Acid (PAFC), Molten Carbonate (MCFC), and Solid Oxide (SOFC) are the most appropriate FC technologies for distributed generation mainly due to their high efficiency, fuel flexibility, low maintenance costs, and high reliability [DOE, energy center]. These FCs have a long start up time and are not suitable for frequent On/Off switching applications. Mathematical model formulated for FCs is presented next.

Operational costs of FCs is approximated as a linear expression including fuel consumption costs, start up costs and maintenance costs:

$$C_{FC,t} = B_{FC} \frac{p_{FC,t}}{\eta_{FC}} + v_{FC,t} C_{FC}^{SU} + w_{FC,t} C_{FC}^{SD} + C_{FC}^m \overline{P}_{FC}, \tag{32}$$

where $\eta_{FC}$, $C_{FC}^{SD}$, and $C_{FC}^m$ denote electrical efficiency, start up costs, shut down costs, and maintenance costs of the FC, respectively.

Minimum and maximum power outputs, minimum up time and down time, ramp up and ramp down, and start up and shut down constraints of FCs are formulated similar to the ones for ICEs (i.e., (15)-(21)).

H. Grid Connection

In the context of Smart Grids, commercial building μGs should be able to operate in both grid-connected and isolated modes. When connected to the grid, the μG can trade energy with the grid to buy/sell energy and provide ancillary services. The μG is assumed to pay to the grid based on Time of Use (TOU) prices for energy purchase (in $/kWh) and flat rate for peak demand charges (in $/kW-month), and to be paid by the utility market operator based on day-ahead Real-Time (RT) pricing for energy supply (in $/kWh) and flat rates for Demand Response (DR) and spinning reserves (in $/kW). Peak demand of the µG is found using the following constraint:

$$p^{dc} \geq p_{Gr,t}, \quad (33)$$

where $p_{Gr,t}$ represents power trade between µG and the grid (with a positive value for buying power from the grid and a negative value for selling to the grid) and $p^{dc}$ represents the peak demand of the µG, respectively.

I. Load Profile

FIG. 1 depicts historical electricity demand profiles of a large commercial building. The demand profiles can be divided into three main categories: weekday, weekend, and peak demand days. The average profile for each of these categories is constructed to be used as µG's load ($P_{L,t}$) in the simulations, as shown in FIG. 2. Notice that losses of the µG are considered in the load profile.

J. Spinning Reserve

To have a certain degree of reliability in operation of a energy system, the system should be able to respond to unexpected changes and provide a reliable power supply. This is referred as energy system "security", and considering spinning reserve is one of the approached to improve energy system security. This is even more crucial in µGs with intermittent RERs and fluctuating loads, where the system should have the capability of responding quickly to supply and demand changes. Various approaches can be used to determine the amount of spinning reserve for an energy system. Although both DERs and DR can be used as spinning reserve resources, in this work, we assume that at least a generation capacity equal to 10% of µG's load at each time must be available as spinning reserve.

Two modes of operation are considered for a commercial building µG: Isolated and grid-connected modes. In this section, appropriate optimization models are formulated to optimally operate the µG in each mode.

K. Grid-Connected Operation Mode

1) Power Balance Constraint

Power balance constraint in the grid-connected mode is as follows:

$$\Sigma_{g=1}^{Ng} p_{g,t} + \Sigma_{m=1}^{Nm} p_{MT,t} + \Sigma_{f=1}^{Nf} p_{FC,t} + P_{pv,t} + P_{Gr,t} + p_{ses,t}^{dch} + p_{mes,t}^{dch} = P_{D,t} + p_{ses,t}^{chg} + p_{mes,t}^{chg} \quad (34)$$

2) Grid Connection

It is assumed that the connection between the µG and the grid has a maximum power transfer capability limit, which implies that purchasing and selling power from/to the grid should be within this limit, as follows:

$$-\underline{P}_{Gr} \leq p_{Gr,t} \leq \overline{P}_{Gr} \quad (35)$$

3) Ancillary Services

In the grid-connected mode, the µG can participate in ancillary service markets of the grid such as spinning reserve market. This market participation is formulated as follows:

$$P_{sp,t} = \Sigma_{g=1}^{Ng}(\overline{P}_g u_{g,t} - p_{g,t}) + \Sigma_{m=1}^{Nm}(\overline{P}_{MT} u_{MT,t} - p_{MT,t}) + \Sigma_{f=1}^{Nf}(\overline{P}_{FC} u_{FC,t} - p_{FC,t}) + p_{mes,t}^{sp} + p_{ses,t}^{sp} - 0.1 P_{D,t} \quad (36)$$

where $P_{sp,t}$ is the amount of spinning reserve power that the µG can offer in the ancillary service market. Note that the spinning reserve is based on the controllable DERs and solar PV is not considered as a source of spinning reserve. Also, the µG should always have a 10% spinning reserve for itself in addition to its bid in the market. It is assumed that price bid by the µG is such that all the offered spinning reserve is accepted in the market. $p_{ses,t}^{sp}$ and $p_{mes,t}^{sp}$ represent the spinning reserve provided by the SES and MES at time t, respectively, and calculated as follows:

$$p_{ses,t}^{sp} = \min\left\{\frac{(e_{ses,t} - SOC_{ses}\overline{E}_{ses})}{\tau}, \overline{P}_{ses} - p_{ses,t}^{dch}\right\} \quad (37)$$

$$p_{mes,t}^{sp} = \min\left\{\frac{(e_{mes,t} - SOC_{mes}\overline{E}_{mes,t})}{\tau}, \overline{P}_{mes,t} - p_{mes,t}^{dch}\right\} \quad (38)$$

These constraints are reformulated as linear constraints in the mode as follows:

$$p_{ses,t}^{sp} \leq \frac{(e_{ses,t} - SOC_{ses}\overline{E}_{ses})}{\tau} \quad (39)$$

$$p_{ses,t}^{sp} \leq \overline{P}_{ses} - p_{ses,t}^{dch} \quad (40)$$

$$p_{mes,t}^{sp} \leq \frac{(e_{mes,t} - SOC_{mes}\overline{E}_{mes,t})}{\tau} \quad (41)$$

$$p_{mes,t}^{sp} \leq \overline{P}_{mes,t} - p_{mes,t}^{dch} \quad (42)$$

4) Objective Functions a) Maximization of Daily Profit

Daily profit of the µG, which is defined as revenue—costs, is as follows:

$$\min \quad p^{dc}C_{Gr,t}^{dc} + \Sigma_{t=1}^{T}\tau[-P_{sp,t}C_{Gr,t}^{sp} + p_{Gr,t}C_{Gr,t}^{s} + \Sigma_{g=1}^{Ng}C_{g,t}^{s} + \Sigma_{m=1}^{Nm}C_{MT,t} + \Sigma_{f=1}^{Nf}C_{FC,t} + C_{pv}^{om} + C_{ses,t} + C_{mes,t}] \quad (43)$$

where $C_{Gr,t}^{sp}$, $C_{Gr,t}^{s}$, and $C_{Gr}^{dc}$ denote spinning reserve price, energy charges, and demand charges of the grid, respectively.

b) Minimize GHG Emissions

Minimization of GHG emissions of the µG in the grid-connected mode is formulated as follows:

$$\min \sum_{t=1}^{T} \tau \left[\sum_{g=1}^{Ng} C_g^{GHG}\frac{p_{g,t}}{\eta_g} + C_{MT}^{GHG}\frac{p_{MT,t}}{\eta_{MT}} + C_{FC}^{GHG}\frac{p_{FC,t}}{\eta_{FC}} + C_{Gr,t}^{GHG}p_{Gr,t}\right] + (e_{mes,T} - e_{mes,0})C_{mes}^{GHG} \quad (44)$$

where $C_{Gr,t}^{GHG}$ denotes marginal GHG emission of the grid at time t.

The above system determines economic and environmental benefits of the application of EVs as MES in commercial building µGs. Energy systems of a commercial building including its grid connection, DERs, Stationary Energy Storage (SES), and demand profile are modeled. Based on the developed models, a Mixed Integer Linear Programming (MILP) problem is formulated to optimizes the operation of a commercial building µG. The objective is to minimize µG's daily operational costs and greenhouse gas emissions (GHG). Technical and operational constraints of DERs and Energy Storage (ES) systems such as minimum up time and down time, and charging and discharging power and capacity constraints of ES devices are formulated to appropriately model the operation of a grid connected commercial µG.

What is claimed is:

1. A method for energy management, comprising:
receiving parameters from management system components;
with a processor, optimizing for one or more selected objective functions optimizing economic and environmental impacts using EVs as mobile energy storage systems for a microgrid powering home or office;

generating an optimal operation schedule for the microgrid management system components;
optimizing operations of one or more electric vehicles (EVs) for mobile energy storage (MES); and
analyzing economic and environmental impacts;
formulating Maximization of Daily Profit Objective function; and
modeling daily profit of the microgrid as:

$$\min p^{dc} C_g^{dc} + \sum_{t=1}^{T} \tau \left[ \begin{array}{c} -p_{sp,t} C_{g,t}^{sp} + p_{g,t} C_{g,t}^{s} + \sum_{i=1}^{N_l} c_{i,t} + \sum_{m=1}^{N_m} c_{m,t} + \sum_{f=1}^{N_f} c_{f,t} + \\ c_{pv}^{om} + c_{ses,t} + c_{mes,t} \end{array} \right]$$

where $\tau$ is time interval, p is charging power, and where $C_{g,t}^{sp}$, $C_{g,t}^{s}$, and $C_g^{dc}$ denote spinning reserve price, energy charges, and demand charges of the grid, respectively.

2. The method of claim 1, comprising modeling of the EVs for optimal planning, operation, and control purposes.

3. The method of claim 1, comprising determining energy balance of the MES as:

$$e_{mes,t} = (1 - \Phi_{mes})e_{mes,t-1} + \tau \left( p_{mes,t}^{chg} \eta_{mes}^{chg} - \frac{p_{mes,t}^{dch}}{\eta_{mes}^{dch}} \right) + E_{mes,t}^{conn} - E_{mes,t}^{disc}$$

where $E_{mes,t}^{conn}$ and $E_{mes,t}^{disc}$ represent energy level of EVs connected to and disconnected from the building at time t, respectively.

4. The method of claim 1, comprising determining energy storage level of MES is limited by minimum and maximum available capacities of the MES at each time interval, $\underline{E}_{mes,t}$ and $\overline{E}_{mes,t}$ respectively, as follows:

$$\underline{SOC}_{mes} \overline{E}_{mes,t} \le e_{mes,t} \le \overline{SOC}_{mes} \overline{E}_{mes,t}$$

where $\overline{E}_{mes,t}$ takes into account physically available connected capacity of EVs to the building and the EV owners' preferences on available energy at the disconnection time of the EV.

5. The method of claim 4, wherein if EV owners do not provide any specific disconnection time energy level of their vehicles, determining $\overline{E}_{mes,t}$ of the MES is built based on the rated capacity connected and disconnected EVs' batteries using the following equation:

$$\overline{E}_{mes,t} = (\overline{E}_{mes,t-1} + \overline{E}_{mes,t}^{conn} - \overline{E}_{mes,t}^{disc})$$

$$\underline{E}_{mes,t} = (\overline{E}_{mes,t-1} + \overline{E}_{mes,t}^{conn} - \overline{E}_{mes,t}^{disc})$$

where $\overline{E}_{mes,t}^{conn}$ and $\overline{E}_{mes,t}^{disc}$ represent connected and disconnected EV capacities at time t.

6. The method of claim 1, comprising considering charge/discharge constraints of EVs.

7. The method of claim 6, comprising applying constraints to ensure that $p_{mes,t}^{chg}$ and $p_{mes,t}^{dch}$ are less than maximum charging and discharging power of the MES at each time interval:

$$0 \le p_{mes,t}^{chg} \le u_{mes,t}^{chg} \overline{P}_{mes,t}$$

$$0 \le p_{mes,t}^{dch} \le u_{mes,t}^{dch} \overline{P}_{mes,t}$$

where $\overline{P}_{mes,t}$ and $\underline{P}_{mes,t}$ are calculated as follows:

$$\overline{P}_{mes,t} = (\overline{P}_{mes,t-1} + \overline{P}_{mes,t}^{conn} - \overline{P}_{mes,t}^{disc}).$$

8. The method of claim 6, comprising determining operational and maintenance costs of the MES with degradation costs and charging and discharging cycles capacity loss of the MES.

9. The method of claim 8, wherein the capacity loss is proportional to the number of charging and discharging cycles as follows:

$$v_{ses,t}^{chg} \ge u_{ses,t}^{chg} - u_{ses,t-1}^{chg}$$

$$v_{ses,t}^{dch} \ge u_{ses,t}^{dch} - u_{ses,t-1}^{dch}$$

$$C_{mes,t} = C_{mes}^{dg} \frac{1}{2}(v_{mes,t}^{chg} + v_{mes,t}^{dch}) + C_{mes}^{c} \overline{E}_{mes,t} + \frac{p_{mes,t}^{dch}}{\eta_{mes}^{dch}} C_{mes,t}^{s} - \frac{p_{mes,t}^{chg}}{\eta_{mes}^{chg}} C_{mes,t}^{d}$$

where $C_{mes}^{dg}$ represents costs of the MES degradation per cycle to be paid by the μG operator to EV owners to reimburse their battery degradation due to charge and discharge by the EMS, $C_{mes}^{c}$ denotes capacity costs to be paid by the μG operator to EV owners for the hours connecting their vehicles to the building EMS. $C_{mes,t}^{s}$ and $C_{mes,t}^{d}$ represent the selling and buying energy price of the EV, respectively.

10. The method of claim 1, comprising modeling degradation costs of EV batteries.

11. The method of claim 10, comprising determining $$C_{mes,t} = C_{mes}^{dg} \frac{1}{2}(v_{mes,t}^{chg} + v_{mes,t}^{dch}) + C_{mes}^{c} \overline{E}_{mes,t} + \frac{p_{mes,t}^{dch}}{\eta_{mes}^{dch}} C_{mes,t}^{s} - \frac{p_{mes,t}^{chg}}{\eta_{mes}^{chg}} C_{mes,t}^{d}$$

where $C_{mes}^{dg}$ represents costs of the MES degradation per cycle to be paid by the μG operator to EV owners to reimburse their battery degradation due to charge and discharge by the EMS, $C_{mes}^{c}$ denotes capacity costs to be paid by the μG operator to EV owners for the hours connecting their vehicles to the building EMS.

12. The method of claim 1, comprising modeling contribution of EVs in Spinning Reserve requirements.

13. The method of claim 12, comprising determining:
$p_{ses,t}^{sp}$ and $p_{mes,t}^{sp}$ represent the spinning reserve provided by the SES and MES at time t, respectively, and calculated as follows:

$$p_{ses,t}^{sp} = \min \left\{ \frac{(e_{ses,t} - \underline{SOC}_{ses} \overline{E}_{ses})}{\tau}, \overline{P}_{ses} - p_{ses,t}^{dch} \right\}$$

$$p_{mes,t}^{sp} = \min \left\{ \frac{(e_{mes,t} - \underline{SOC}_{mes} \overline{E}_{mes,t})}{\tau}, \overline{P}_{mes,t} - p_{mes,t}^{dch} \right\};$$

and
reformulating constraints as follows:

$$p_{ses,t}^{sp} \le \frac{(e_{ses,t} - \underline{SOC}_{ses} \overline{E}_{ses})}{\tau}$$

$$p_{ses,t}^{sp} \le \overline{P}_{ses} - p_{ses,t}^{dch}$$

$$p_{mes,t}^{sp} \le \frac{(e_{mes,t} - \underline{SOC}_{mes} \overline{E}_{mes,t})}{\tau}$$

$$p_{mes,t}^{sp} \le \overline{P}_{mes,t} - p_{mes,t}^{dch}.$$

14. The method of claim 1, comprising performing modeling of a grid connection by a microgrid and the grid, wherein a connection between the microgrid and the grid has a maximum power transfer capability limit as follows:

$$-\underline{P}_g > p_{g,t} \leq \overline{P}_g.$$

15. The method of claim 1, comprising considering peak demand charges for grid connection.

16. The method of claim 1, wherein a grid-connected mode, a microgrid participates in ancillary service markets of the grid market using:

$$p_{sp,t} = \sum_{i=1}^{N_i}(\overline{P}_i u_{i,t} - p_{i,t}) + \sum_{m=1}^{N_m}(\overline{P}_m u_{m,t} - p_{m,t}) + \sum_{f=1}^{N_f}(\overline{P}_f u_{f,t} - p_{f,t}) + p_{mes,t}^{sp} + p_{ses,t}^{sp} - 0.1 P_{D,t}$$

where $p_{sp,t}$ is the amount of spinning reserve power that the μG can offer in the ancillary service market.

17. The method of claim 1, comprising minimizing GHG Emissions Objective function.

18. The method of claim 17, wherein minimization of GHG emissions of the microgrid in a grid-connected mode comprises:

$$\min \sum_{t=1}^{T} \tau \left[ \sum_{i=1}^{N_i} \varepsilon_i^{GHG} \frac{p_{i,t}}{\eta_i} + \varepsilon_m^{GHG} \frac{p_{m,t}}{\eta_m} + \varepsilon_f^{GHG} \frac{p_{f,t}}{\eta_f} + \varepsilon_{g,t}^{GHG} p_{g,t} \right] + (e_{mes,T} - e_{mes,0}) \varepsilon_{mes}^{GHG}$$

where $\epsilon_{g,t}^{GHG}$ denotes marginal GHG emission of the grid at time t.

* * * * *